(12) United States Patent
Bacim De Araujo E Silva et al.

(10) Patent No.: US 12,200,185 B1
(45) Date of Patent: Jan. 14, 2025

(54) RAY TRACING IN A DISPLAY

(71) Applicant: Apple Inc., Cupertino, CA (US)

(72) Inventors: Felipe Bacim De Araujo E Silva, San Jose, CA (US); Seung Wook Kim, San Jose, CA (US); Edwin Iskandar, San Jose, CA (US); Pavel V Dudrenov, San Francisco, CA (US); Zachary D Corley, Newark, CA (US); Hao Chen, Santa Clara, CA (US); Ping-Yen Chou, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 208 days.

(21) Appl. No.: 17/885,455

(22) Filed: Aug. 10, 2022

Related U.S. Application Data

(63) Continuation-in-part of application No. 17/348,281, filed on Jun. 15, 2021, now Pat. No. 11,962,742.

(60) Provisional application No. 63/064,321, filed on Aug. 11, 2020, provisional application No. 63/064,330, filed on Aug. 11, 2020, provisional application No. 63/064,342, filed on Aug. 11, 2020.

(51) Int. Cl.
*H04N 13/305* (2018.01)
*H04N 13/15* (2018.01)
*H04N 13/167* (2018.01)
*H04N 13/327* (2018.01)
*H04N 13/398* (2018.01)
H04N 13/366 (2018.01)

(52) U.S. Cl.
CPC ......... *H04N 13/327* (2018.05); *H04N 13/15* (2018.05); *H04N 13/167* (2018.05); *H04N 13/305* (2018.05); *H04N 13/398* (2018.05); H04N 13/366 (2018.05)

(58) Field of Classification Search
CPC ...... G06T 15/06; H04N 13/327; H04N 13/15; H04N 13/167; H04N 13/305; H04N 13/398; H04N 13/366
See application file for complete search history.

(56) References Cited

U.S. PATENT DOCUMENTS

| | | |
|---|---|---|
| 5,930,037 A | 7/1999 | Imai |
| 5,959,664 A | 9/1999 | Woodgate |
| 6,897,874 B1 | 5/2005 | Riach |
| 7,375,886 B2 | 5/2008 | Lipton et al. |
| 7,525,541 B2 | 4/2009 | Chun et al. |
| 7,671,889 B2 | 3/2010 | Lipton et al. |

(Continued)

FOREIGN PATENT DOCUMENTS

CN 103869566 A 6/2014

*Primary Examiner* — Antonio A Caschera
(74) *Attorney, Agent, or Firm* — Treyz Law Group, P.C.; Joseph F. Guihan; Jinie M. Guihan

(57) ABSTRACT

An electronic device may include a lenticular display. The lenticular display may have a lenticular lens film formed over an array of pixels. The display may include ray tracing circuitry that is configured to, using ray tracing, a three-dimensional image, and deflection measurements for the array of pixels, output a display calibration map that includes, for each pixel in the array of pixels, a corresponding location on a two-dimensional image. The display may also include pixel mapping circuitry configured to, using the display calibration map from the ray tracing circuitry, map the two-dimensional image to respective pixels on the array of pixels to obtain pixel data for the array of pixels.

20 Claims, 12 Drawing Sheets

(56) References Cited

U.S. PATENT DOCUMENTS

| | | |
|---|---|---|
| 8,284,204 B2 | 10/2012 | Kalaiah et al. |
| 8,531,451 B2 | 9/2013 | Mital et al. |
| 8,750,599 B2 | 6/2014 | Godar |
| 8,823,890 B2 | 9/2014 | Sekine |
| 9,143,770 B2 | 9/2015 | Bennett et al. |
| 9,244,284 B2 | 1/2016 | Sykora et al. |
| 9,250,446 B2 | 2/2016 | Krijn et al. |
| 9,317,895 B1 | 4/2016 | Tidwell |
| 9,565,414 B2 | 2/2017 | Smolic et al. |
| 9,712,810 B2 | 7/2017 | Smithwick et al. |
| 9,829,612 B1 | 11/2017 | Koudsi et al. |
| 10,157,448 B2 | 12/2018 | Nguyen et al. |
| 10,241,342 B2 | 3/2019 | Wei |
| 10,459,238 B2 | 10/2019 | Vdovin et al. |
| 10,551,913 B2 | 2/2020 | McCombe et al. |
| 2004/0066363 A1 | 4/2004 | Yamano et al. |
| 2004/0080821 A1 | 4/2004 | Yamaguchi et al. |
| 2009/0073556 A1 | 3/2009 | Bent-Gourley |
| 2011/0096156 A1 | 4/2011 | Kim et al. |
| 2012/0019635 A1 | 1/2012 | Jian |
| 2013/0057159 A1 | 3/2013 | Pijlman et al. |
| 2013/0293547 A1 | 11/2013 | Du et al. |
| 2015/0078723 A1 | 3/2015 | Curcio et al. |
| 2015/0201188 A1 | 7/2015 | Pritch et al. |
| 2016/0088280 A1 | 3/2016 | Sadi et al. |
| 2016/0117807 A1 | 4/2016 | Matsumoto |
| 2017/0366805 A1* | 12/2017 | Sevostianov ........ H04N 13/398 |
| 2018/0152696 A1 | 5/2018 | Jin et al. |
| 2018/0176604 A1 | 6/2018 | Chesnokov |
| 2018/0181163 A1 | 6/2018 | Shin et al. |
| 2018/0240383 A1 | 8/2018 | Huh et al. |
| 2018/0247394 A1 | 8/2018 | Lee et al. |
| 2018/0247582 A1 | 8/2018 | Park et al. |
| 2018/0307269 A1 | 10/2018 | Pantel |
| 2018/0308413 A1 | 10/2018 | Jin et al. |
| 2019/0035149 A1 | 1/2019 | Chen et al. |
| 2019/0268588 A1 | 8/2019 | Frayne et al. |
| 2021/0297653 A1 | 9/2021 | Huang et al. |
| 2022/0365361 A1 | 11/2022 | Woodgate et al. |
| 2023/0042351 A1 | 2/2023 | Kurihara et al. |

\* cited by examiner

RAY TRACING IN A DISPLAY

This application is a continuation-in-part of non-provisional patent application Ser. No. 17/348,281, filed Jun. 15, 2021, which claims the benefit of provisional patent application No. 63/064,321, filed Aug. 11, 2020, provisional patent application No. 63/064,330, filed Aug. 11, 2020, and provisional patent application No. 63/064,342, filed Aug. 11, 2020, which are hereby incorporated by reference herein in their entireties.

FIELD

This relates generally to electronic devices, and, more particularly, to electronic devices with displays.

BACKGROUND

Electronic devices often include displays. In some cases, displays may include lenticular lenses that enable the display to provide three-dimensional content to the viewer. The lenticular lenses may be formed over an array of pixels such as organic light-emitting diode pixels or liquid crystal display pixels.

SUMMARY

An electronic device may include a lenticular display. The lenticular display may have a lenticular lens film formed over an array of pixels. A plurality of lenticular lenses may extend across the length of the display. The lenticular lenses may be configured to enable stereoscopic viewing of the display such that a viewer perceives three-dimensional images.

The display may have a number of independently controllable viewing zones. Each viewing zone displays a respective two-dimensional image. Each eye of the viewer may receive a different one of the two-dimensional images, resulting in a perceived three-dimensional image. Control circuitry in the electronic device may use the captured images from the eye and/or head tracking system to determine which viewing zones are occupied by the viewer's eyes.

The electronic device may include display pipeline circuitry that generates and process content to be displayed on the lenticular display. Content generating circuitry may initially generate content that includes a plurality of two-dimensional images, each two-dimensional image corresponding to a respective viewing zone.

The two-dimensional images may be processed by per-view processing circuitry. Tone mapping circuitry may convert content luminance values to display luminance values. Ambient light adaptation circuitry and white point calibration circuitry may be used to adjust the display luminance values. Dithering circuitry may be used to dither the two-dimensional images.

Pixel mapping circuitry may be used to map the two-dimensional images to the array of pixels in the lenticular display. Each two-dimensional image may have a respective subset of pixels on the display, such that the two-dimensional images are blended together and displayed simultaneously. After pixel mapping, additional panel-level processing such as burn-in compensation and panel response compensation may be performed.

The display may include ray tracing circuitry that is configured to, using ray tracing, a three-dimensional image, and deflection measurements for the array of pixels, output a display calibration map that includes, for each pixel in the array of pixels, a corresponding location on a two-dimensional image. The display may also include pixel mapping circuitry configured to, using the display calibration map from the ray tracing circuitry, map the two-dimensional image to respective pixels on the array of pixels to obtain pixel data for the array of pixels.

DETAILED DESCRIPTION

Figure 1:
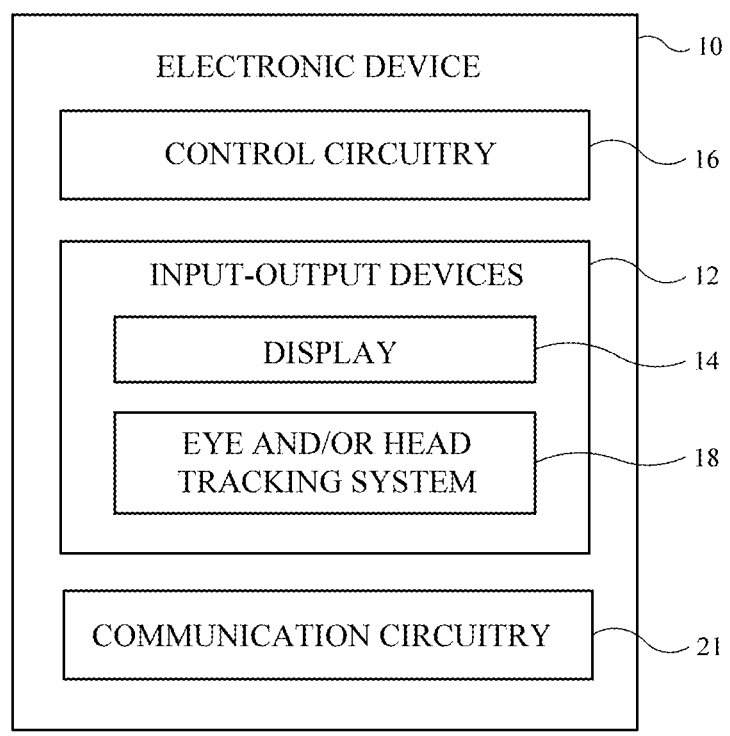
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, and other electrical components. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Some electronic devices may include two displays. In one possible arrangement, a first display may be positioned on one side of the device and a second display may be positioned on a second, opposing side of the device. The first and second displays therefore may have a back-to-back arrangement. One or both of the displays may be curved.

Sensors in input-output devices 12 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors in input-output devices 12 may include optical sensors such as optical sensors that emit and detect light, ultrasonic sensors, optical touch sensors, optical proximity sensors, and/or other touch sensors and/or proximity sensors, monochromatic and color ambient light sensors, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), humidity sensors, moisture sensors, gaze tracking sensors, and/or other sensors.

Control circuitry 16 may be used to run software on device 10 such as operating system code and applications. During operation of device 10, the software running on control circuitry 16 may display images on display 14 using an array of pixels in display 14.

Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display are sometimes described herein as an example.

Display 14 may have a rectangular shape (i.e., display 14 may have a rectangular footprint and a rectangular peripheral edge that runs around the rectangular footprint) or may have other suitable shapes. Display 14 may have one or more rounded corners. Display 14 may be planar or may have a curved profile.

Device 10 may include cameras and other components that form part of gaze and/or head tracking system 18. The camera(s) or other components of system 18 may face an expected location for a viewer and may track the viewer's eyes and/or head (e.g., images and other information captured by system 18 may be analyzed by control circuitry 16 to determine the location of the viewer's eyes and/or head). This head-location information obtained by system 18 may be used to determine the appropriate direction with which display content from display 14 should be directed. Eye and/or head tracking system 18 may include any desired number/combination of infrared and/or visible light detectors. Eye and/or head tracking system 18 may optionally include light emitters to illuminate the scene.

Figure 2:
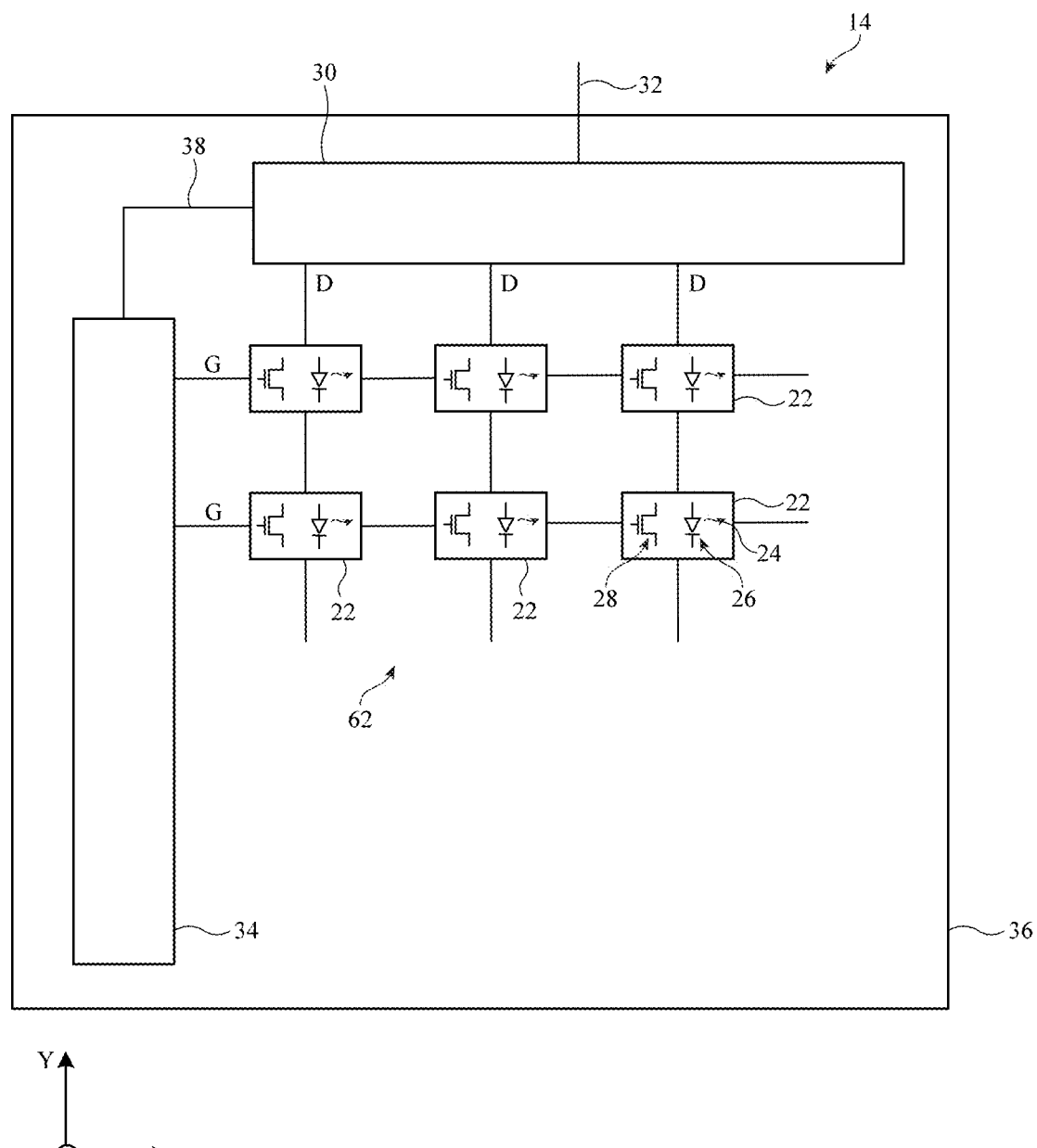
FIG. 2 is a top view of an illustrative display in an electronic device in accordance with an embodiment.

A top view of a portion of display 14 is shown in FIG. 2. As shown in FIG. 2, display 14 may have an array 62 of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel circuit formed from thin-film transistor circuitry (such as thin-film transistors 28 and thin-film capacitors). Thin-film transistors 28 may be poly-silicon thin-film transistors, semiconducting-oxide thin-film transistors such as indium gallium zinc oxide transistors, or thin-film transistors formed from other semiconductors. Pixels 22 may contain light-emitting diodes of different colors (e.g., red, green, and blue diodes for red, green, and blue pixels, respectively) to provide display 14 with the ability to display color images.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14.

Gate driver circuitry 34 (sometimes referred to as horizontal control line control circuitry) may be implemented as part of an integrated circuit and/or may be implemented using thin-film transistor circuitry. Horizontal control lines G in display 14 may carry gate line signals (scan line signals), emission enable control signals, and other horizontal control signals for controlling the pixels of each row. There may be any suitable number of horizontal control signals per row of pixels 22 (e.g., one or more, two or more, three or more, four or more, etc.).

Display 14 may sometimes be a stereoscopic display that is configured to display three-dimensional content for a viewer. Stereoscopic displays are capable of displaying multiple two-dimensional images that are viewed from slightly different angles. When viewed together, the combination of the two-dimensional images creates the illusion of a three-dimensional image for the viewer. For example, a viewer's left eye may receive a first two-dimensional image and a viewer's right eye may receive a second, different two-dimensional image. The viewer perceives these two different two-dimensional images as a single three-dimensional image.

There are numerous ways to implement a stereoscopic display. Display 14 may be a lenticular display that uses lenticular lenses (e.g., elongated lenses that extend along parallel axes), may be a parallax barrier display that uses parallax barriers (e.g., an opaque layer with precisely spaced slits to create a sense of depth through parallax), may be a volumetric display, or may be any other desired type of stereoscopic display. Configurations in which display 14 is a lenticular display are sometimes described herein as an example.

Figure 3:
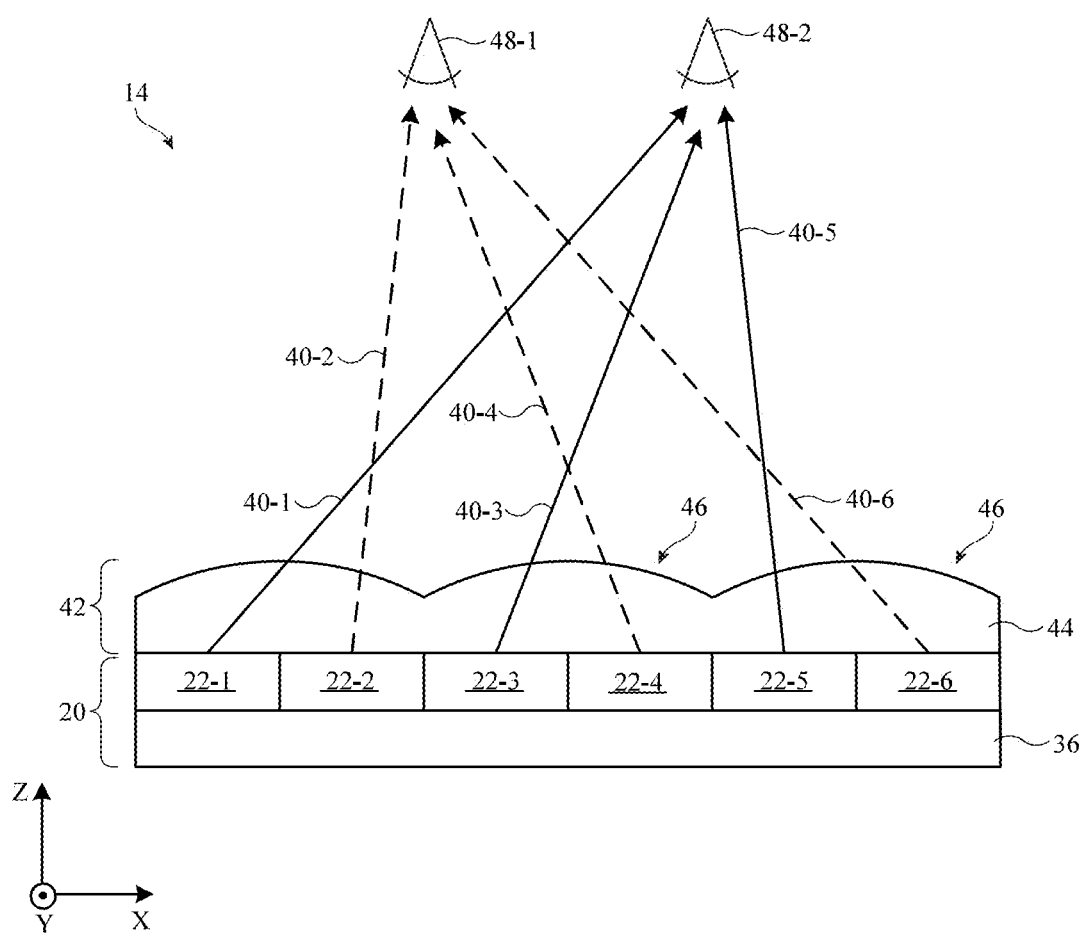
FIG. 3 is a cross-sectional side view of an illustrative lenticular display that provides images to a viewer in accordance with an embodiment.

FIG. 3 is a cross-sectional side view of an illustrative lenticular display that may be incorporated into electronic device 10. Display 14 includes a display panel 20 with pixels 22 on substrate 36. Substrate 36 may be formed from glass, metal, plastic, ceramic, or other substrate materials and pixels 22 may be organic light-emitting diode pixels, liquid crystal display pixels, or any other desired type of pixels.

As shown in FIG. 3, lenticular lens film 42 may be formed over the display pixels. Lenticular lens film 42 (sometimes referred to as a light redirecting film, a lens film, etc.) includes lenses 46 and a base film portion 44 (e.g., a planar film portion to which lenses 46 are attached). Lenses 46 may be lenticular lenses that extend along respective longitudinal axes (e.g., axes that extend into the page parallel to the Y-axis). Lenses 46 may be referred to as lenticular elements 46, lenticular lenses 46, optical elements 46, etc.

The lenses 46 of the lenticular lens film cover the pixels of display 14. An example is shown in FIG. 3 with display pixels 22-1, 22-2, 22-3, 22-4, 22-5, and 22-6. In this example, display pixels 22-1 and 22-2 are covered by a first lenticular lens 46, display pixels 22-3 and 22-4 are covered by a second lenticular lens 46, and display pixels 22-5 and 22-6 are covered by a third lenticular lens 46. The lenticular lenses may redirect light from the display pixels to enable stereoscopic viewing of the display.

Consider the example of display 14 being viewed by a viewer with a first eye (e.g., a right eye) 48-1 and a second eye (e.g., a left eye) 48-2. Light from pixel 22-1 is directed by the lenticular lens film in direction 40-1 towards left eye 48-2, light from pixel 22-2 is directed by the lenticular lens film in direction 40-2 towards right eye 48-1, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-2, light from pixel 22-6 is directed by the lenticular lens film in direction 40-6 towards right eye 48-1. In this way, the viewer's right eye 48-1 receives images from pixels 22-2, 22-4, and 22-6, whereas left eye 48-2 receives images from pixels 22-1, 22-3, and 22-5. Pixels 22-2, 22-4, and 22-6 may be used to display a slightly different image than pixels 22-1, 22-3, and 22-5. Consequently, the viewer may perceive the received images as a single three-dimensional image.

Pixels of the same color may be covered by a respective lenticular lens 46. In one example, pixels 22-1 and 22-2 may be red pixels that emit red light, pixels 22-3 and 22-4 may be green pixels that emit green light, and pixels 22-5 and 22-6 may be blue pixels that emit blue light. This example is merely illustrative. In general, each lenticular lens may cover any desired number of pixels each having any desired color. The lenticular lens may cover a plurality of pixels having the same color, may cover a plurality of pixels each having different colors, may cover a plurality of pixels with some pixels being the same color and some pixels being different colors, etc.

Figure 4:
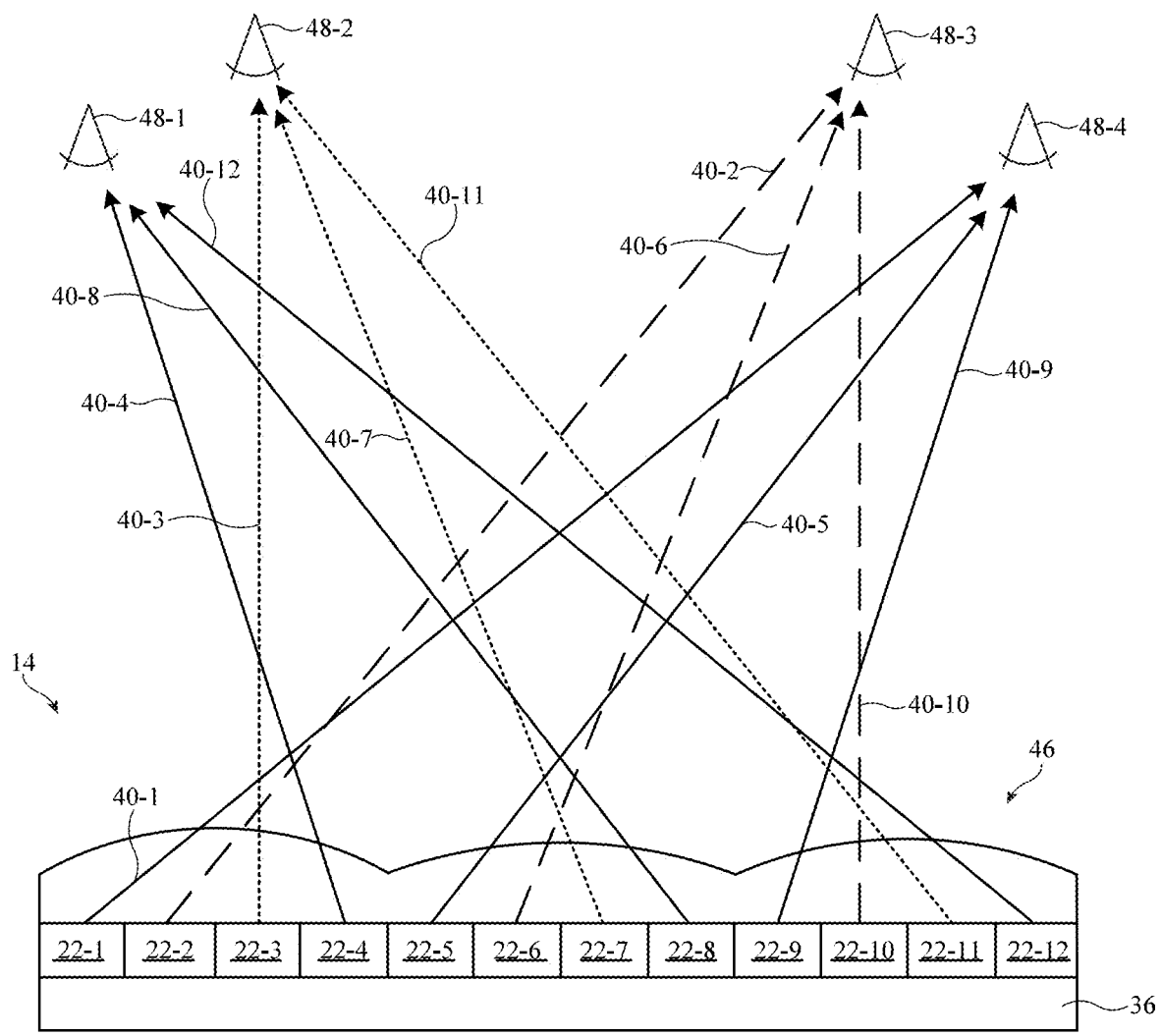
FIG. 4 is a cross-sectional side view of an illustrative lenticular display that provides images to two or more viewers in accordance with an embodiment.

FIG. 4 is a cross-sectional side view of an illustrative stereoscopic display showing how the stereoscopic display may be viewable by multiple viewers. The stereoscopic display of FIG. 3 may have one optimal viewing position (e.g., one viewing position where the images from the display are perceived as three-dimensional). The stereoscopic display of FIG. 4 may have two or more optimal viewing positions (e.g., two or more viewing positions where the images from the display are perceived as three-dimensional).

Display 14 may be viewed by both a first viewer with a right eye 48-1 and a left eye 48-2 and a second viewer with a right eye 48-3 and a left eye 48-4. Light from pixel 22-1 is directed by the lenticular lens film in direction 40-1 towards left eye 48-4, light from pixel 22-2 is directed by the lenticular lens film in direction 40-2 towards right eye 48-3, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-4, light from pixel 22-6 is directed by the lenticular lens film in direction 40-6 towards right eye 48-3, light from pixel 22-7 is directed by the lenticular lens film in direction 40-7 towards left eye 48-2, light from pixel 22-8 is directed by the lenticular lens film in direction 40-8 towards right eye 48-1, light from pixel 22-9 is directed by the lenticular lens film in direction 40-9 towards left eye 48-4, light from pixel 22-10 is directed by the lenticular lens film in direction 40-10 towards right eye 48-3, light from pixel 22-11 is directed by the lenticular lens film in direction 40-11 towards left eye 48-2, and light from pixel 22-12 is directed by the lenticular lens film in direction 40-12 towards right eye 48-1. In this way, the first viewer's right eye 48-1 receives images from pixels 22-4, 22-8, and 22-12, whereas left eye 48-2 receives images from pixels 22-3, 22-7, and 22-11. Pixels 22-4, 22-8, and 22-12 may be used to display a slightly different image than pixels 22-3, 22-7, and 22-11. Consequently, the first viewer may perceive the received images as a single three-dimensional image. Similarly, the second viewer's right eye 48-3 receives images from pixels 22-2, 22-6, and 22-10, whereas left eye 48-4 receives images from pixels 22-1, 22-5, and 22-9. Pixels 22-2, 22-6, and 22-10 may be used to display a slightly different image than pixels 22-1, 22-5, and 22-9. Consequently, the second viewer may perceive the received images as a single three-dimensional image.

Pixels of the same color may be covered by a respective lenticular lens 46. In one example, pixels 22-1, 22-2, 22-3, and 22-4 may be red pixels that emit red light, pixels 22-5, 22-6, 22-7, and 22-8 may be green pixels that emit green light, and pixels 22-9, 22-10, 22-11, and 22-12 may be blue pixels that emit blue light. This example is merely illustrative. The display may be used to present the same three-dimensional image to both viewers or may present different three-dimensional images to different viewers. In some cases, control circuitry in the electronic device 10 may use eye and/or head tracking system 18 to track the position of one or more viewers and display images on the display based on the detected position of the one or more viewers.

It should be understood that the lenticular lens shapes and directional arrows of FIGS. 3 and 4 are merely illustrative. The actual rays of light from each pixel may follow more complicated paths (e.g., with redirection occurring due to refraction, total internal reflection, etc.). Additionally, light from each pixel may be emitted over a range of angles. The lenticular display may also have lenticular lenses of any desired shape or shapes. Each lenticular lens may have a width that covers two pixels, three pixels, four pixels, more than four pixels, more than ten pixels, more than fifteen pixels, less than twenty-five pixels, etc. Each lenticular lens may have a length that extends across the entire display (e.g., parallel to columns of pixels in the display).

Figure 5:
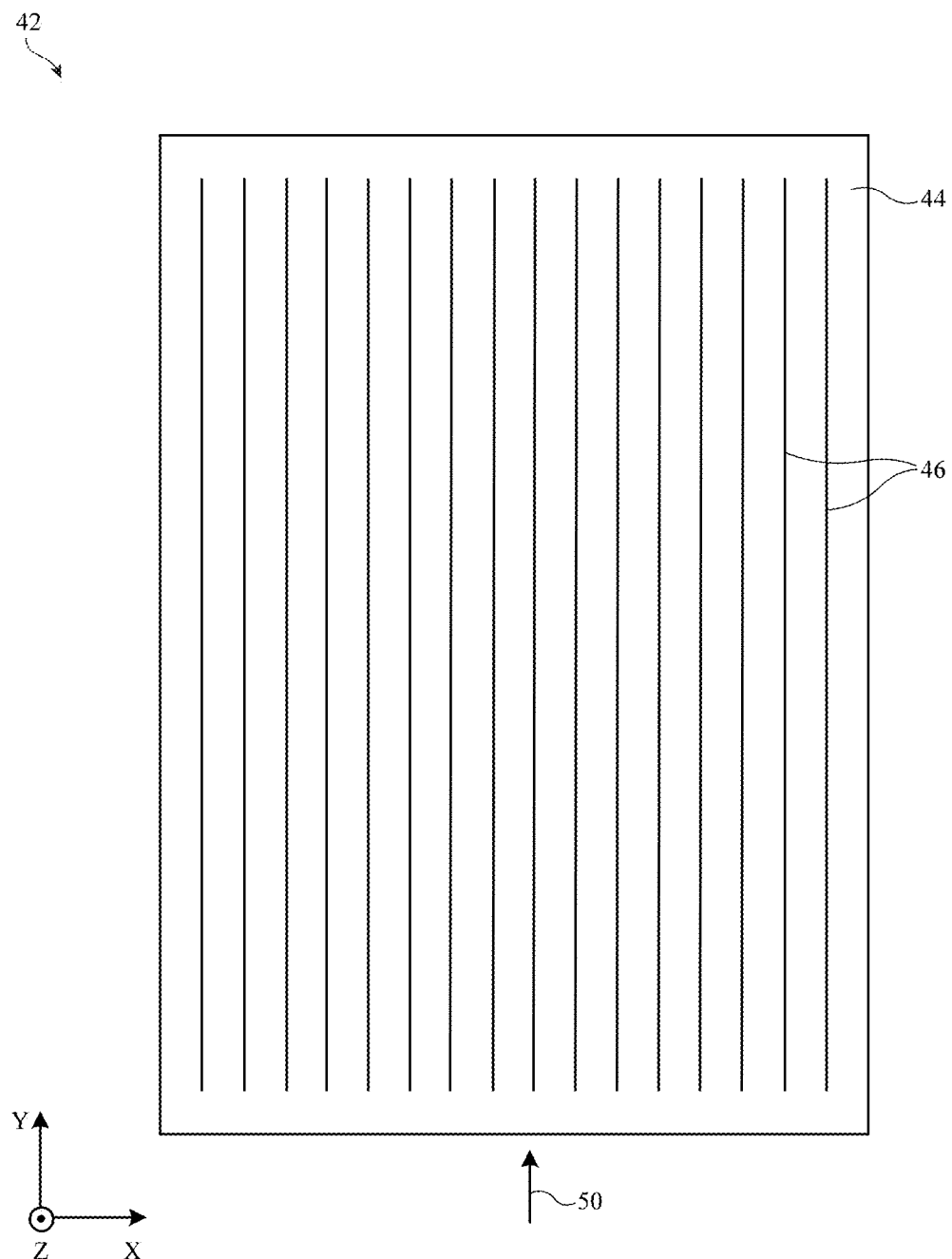
FIG. 5 is a top view of an illustrative lenticular lens film showing the elongated shape of the lenticular lenses in accordance with an embodiment.

FIG. 5 is a top view of an illustrative lenticular lens film that may be incorporated into a lenticular display. As shown in FIG. 5, elongated lenses 46 extend across the display parallel to the Y-axis. For example, the cross-sectional side view of FIGS. 3 and 4 may be taken looking in direction 50. The lenticular display may include any desired number of lenticular lenses 46 (e.g., more than 10, more than 100, more than 1,000, more than 10,000, etc.). In FIG. 5, the lenticular lenses extend perpendicular to the upper and lower edge of the display panel. This arrangement is merely illustrative, and the lenticular lenses may instead extend at a non-zero, non-perpendicular angle (e.g., diagonally) relative to the display panel if desired.

Figure 6:
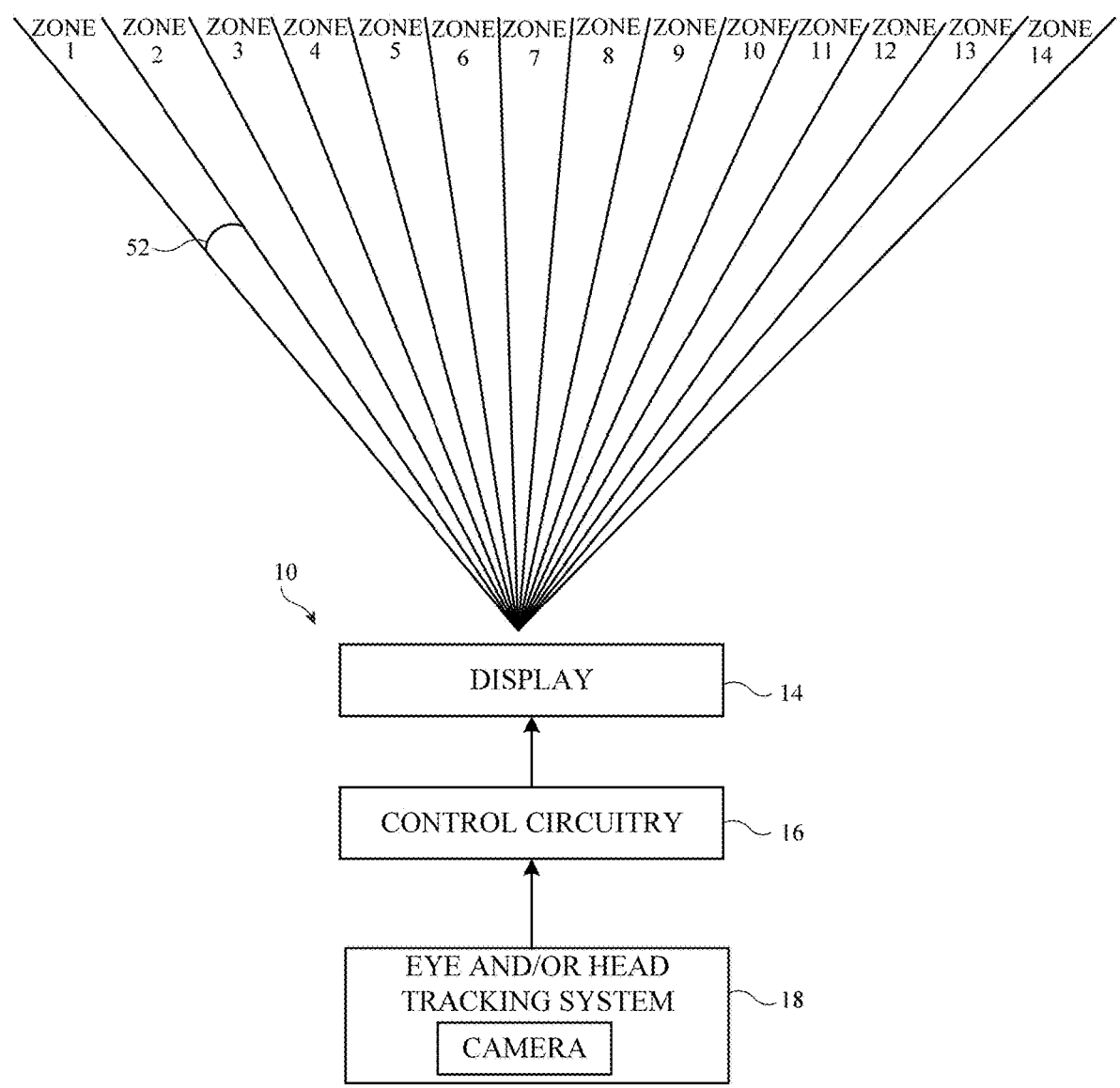
FIG. 6 is a diagram of an illustrative display that includes an eye and/or head tracking system that determines viewer eye position and control circuitry that updates the display based on the viewer eye position in accordance with an embodiment.

FIG. 6 is a schematic diagram of an illustrative electronic device showing how information from eye and/or head tracking system 18 may be used to control operation of the display. As shown in FIG. 6, display 14 is capable of providing unique images across a number of distinct zones. In FIG. 6, display 14 emits light across 14 zones, each having a respective angle of view 52. The angle 52 may be between 1° and 2°, between 0° and 4°, less than 5°, less than 3°, less than 2°, less than 1.5°, greater than 0.5°, or any other desired angle. Each zone may have the same associated viewing angle or different zones may have different associated viewing angles.

The example herein of the display having 14 independently controllable zones is merely illustrative. In general, the display may have any desired number of independently controllable zones (e.g., more than 2, more than 6, more than 10, more than 12, more than 16, more than 20, more than 30, more than 40, less than 40, between 10 and 30, between 12 and 25, etc.).

Each zone is capable of displaying a unique image to the viewer. The sub-pixels on display 14 may be divided into groups, with each group of sub-pixels capable of displaying an image for a particular zone. For example, a first subset of sub-pixels in display 14 is used to display an image (e.g., a two-dimensional image) for zone 1, a second subset of sub-pixels in display 14 is used to display an image for zone 2, a third subset of sub-pixels in display 14 is used to display an image for zone 3, etc. In other words, the sub-pixels in display 14 may be divided into 14 groups, with each group associated with a corresponding zone (sometimes referred to as viewing zone) and capable of displaying a unique image for that zone. The sub-pixel groups may also themselves be referred to as zones.

Control circuitry 16 may control display 14 to display desired images in each viewing zone. There is much flexibility in how the display provides images to the different viewing zones. Display 14 may display entirely different content in different zones of the display. For example, an image of a first object (e.g., a cube) is displayed for zone 1, an image of a second, different object (e.g., a pyramid) is displayed for zone 2, an image of a third, different object (e.g., a cylinder) is displayed for zone 3, etc. This type of scheme may be used to allow different viewers to view entirely different scenes from the same display. However, in practice there may be crosstalk between the viewing zones.

As an example, content intended for zone 3 may not be contained entirely within viewing zone 3 and may leak into viewing zones 2 and 4.

Figure 7A:
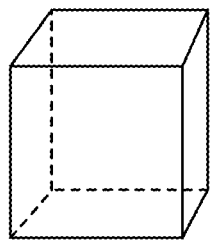
FIGS. 7A-7C are perspective views of illustrative three-dimensional content that may be displayed on different zones of the display of FIG. 6 in accordance with an embodiment.
Figure 7B:
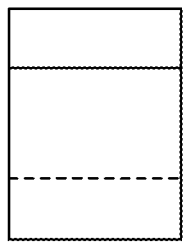
Figure 7C:
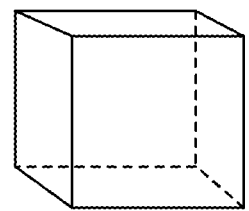

Therefore, in another possible use-case, display 14 may display a similar image for each viewing zone, with slight adjustments for perspective between each zone. This may be referred to as displaying the same content at different perspectives (or different views), with one image corresponding to a unique perspective of the same content. For example, consider an example where the display is used to display a three-dimensional cube. The same content (e.g., the cube) may be displayed on all of the different zones in the display. However, the image of the cube provided to each viewing zone may account for the viewing angle associated with that particular zone. In zone 1, for example, the viewing cone may be at a $-10°$ angle relative to the surface normal of the display. Therefore, the image of the cube displayed for zone 1 may be from the perspective of a $-10°$ angle relative to the surface normal of the cube (as in FIG. 7A). Zone 7, in contrast, is at approximately the surface normal of the display. Therefore, the image of the cube displayed for zone 7 may be from the perspective of a $0°$ angle relative to the surface normal of the cube (as in FIG. 7B). Zone 14 is at a $10°$ angle relative to the surface normal of the display. Therefore, the image of the cube displayed for zone 14 may be from the perspective of a $10°$ angle relative to the surface normal of the cube (as in FIG. 7C). As a viewer progresses from zone 1 to zone 14 in order, the appearance of the cube gradually changes to simulate looking at a real-world object.

There are many possible variations for how display 14 displays content for the viewing zones. In general, each viewing zone may be provided with any desired image based on the application of the electronic device. Different zones may provide different images of the same content at different perspectives, different zones may provide different images of different content, etc.

Figure 8:
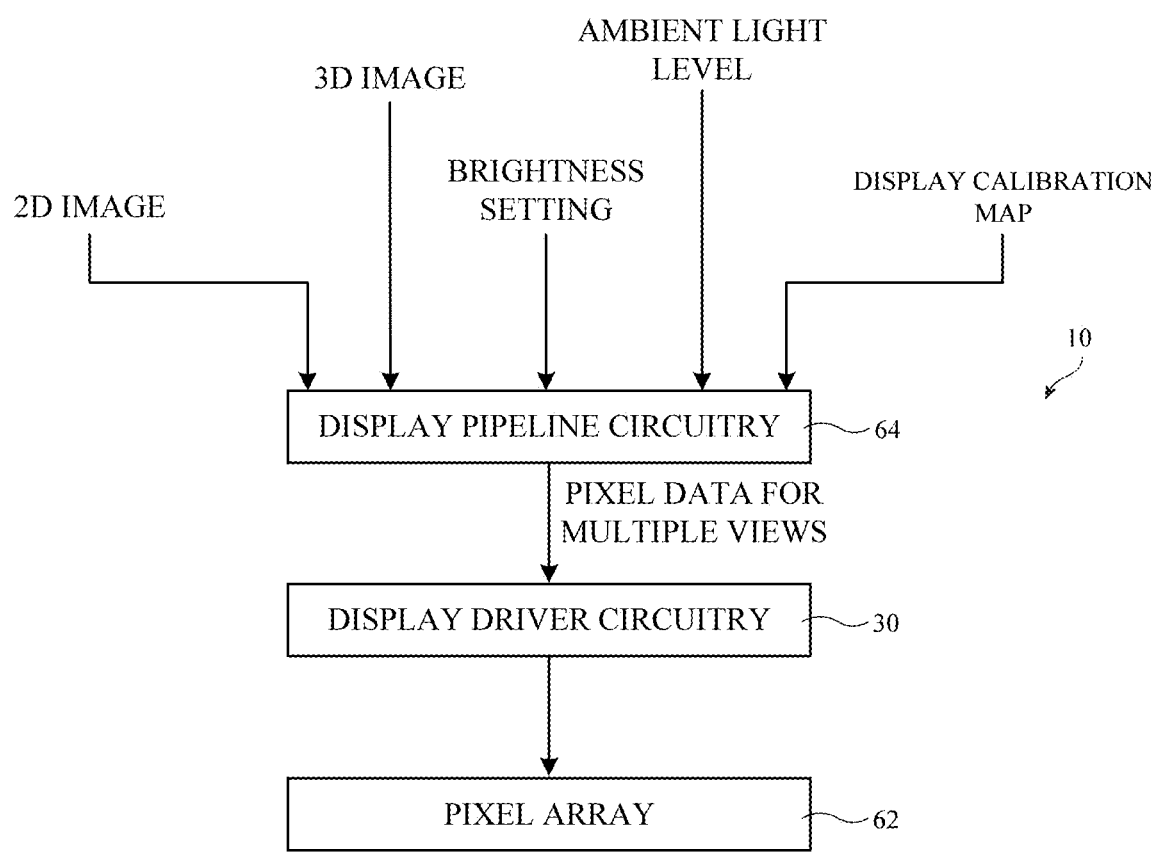
FIG. 8 is a schematic diagram of an illustrative lenticular display including display pipeline circuitry in accordance with an embodiment.

FIG. 8 is a schematic diagram of an electronic device including display pipeline circuitry. The display pipeline circuitry 64 provides pixel data to display driver circuitry 30 for display on pixel array 62. Pipeline circuitry 64 may use various inputs to render an image and generate pixel brightness values for each pixel in the pixel array based on the image. In the example of FIG. 8, the display may be used to provide images of the same content at different perspectives in each viewing zone. In other words, each subset of the pixel array associated with a given viewing zone displays a different view of the same content. As a viewer changes viewing zones, the appearance of the content gradually changes to simulate looking at a real-world object.

There are numerous steps that may be involved in display pipeline circuitry 64 generating pixel data for the pixel array. First, the display pipeline circuitry may render content that is intended to be displayed by the lenticular display. The display pipeline circuitry may render a plurality of two-dimensional images of target content, with each two-dimensional image corresponding to a different view of the target content. In one example, the target content may be based on a two-dimensional (2D) image and a three-dimensional (3D) image. The two-dimensional image and the three-dimensional image may optionally be captured by a respective two-dimensional image sensor and three-dimensional image sensor in electronic device 10. This example is merely illustrative. The content may be rendered based on two-dimensional/three-dimensional images from other sources (e.g., from sensors on another device, computer-generated images, etc.).

The two-dimensional images associated with different views may be compensated based on various factors (e.g., a brightness setting for the device, ambient light levels, etc.). After the two-dimensional images of different views are compensated, the plurality of two-dimensional images may be combined and provided to the single pixel array 62. A display calibration map may be used to determine which pixels in the pixel array correspond to each view (e.g., each of the plurality of two-dimensional images). Additional compensation steps may be performed after determining the pixel data for the entire pixel array based on the plurality of different views. Once the additional compensation is complete, the pixel data may be provided to the display driver circuitry 30. The pixel data provided to display driver circuitry 30 includes a brightness level (e.g., voltage) for each pixel in pixel array 62. These brightness levels are used to simultaneously display a plurality of two-dimensional images on the pixel array, each two-dimensional image corresponding to a unique view of the target content that is displayed in a respective unique viewing zone.

Figure 9:
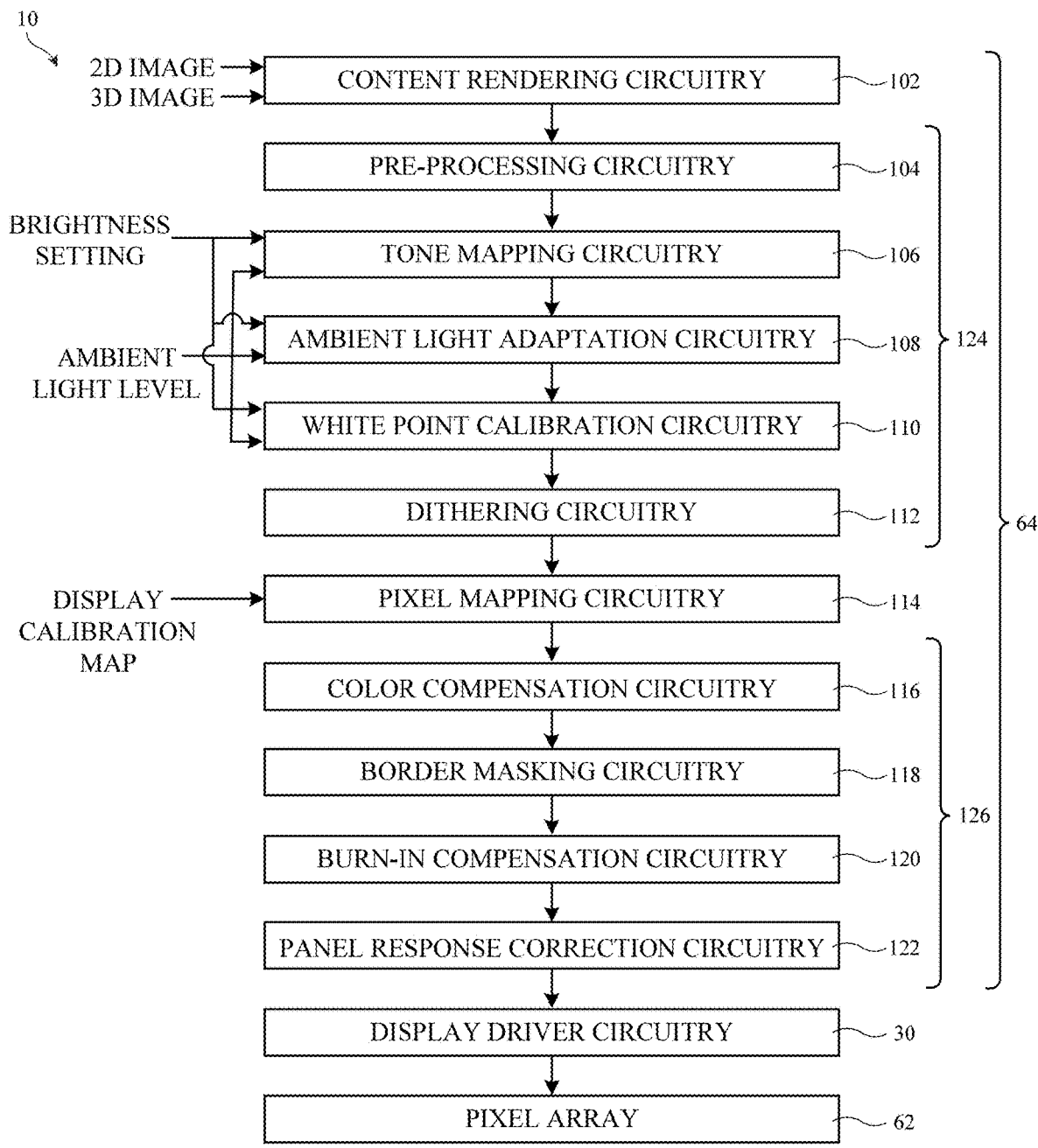
FIG. 9 is a schematic diagram of an illustrative lenticular display with display pipeline circuitry that includes both per-view processing circuitry and panel-level processing circuitry in accordance with an embodiment.

FIG. 9 is a schematic diagram showing additional details of the display pipeline circuitry of FIG. 8. As shown in FIG. 9, display pipeline circuitry 64 may include content rendering circuitry 102, pre-processing circuitry 104, tone mapping circuitry 106, ambient light adaptation circuitry 108, white point calibration circuitry 110, dithering circuitry 112, pixel mapping circuitry 114, color compensation circuitry 116, border masking circuitry 118, burn-in compensation circuitry 120, and panel response correction circuitry 122.

Content rendering circuitry 102 may render a two-dimensional image for each respective viewing zone in the display. In the example of FIG. 6, the display has 14 viewing zones. In this example, content rendering circuitry 102 would render 14 two-dimensional images, with one two-dimensional image for each viewing zone. As previously discussed, there is flexibility in the type of content that is displayed in each of the viewing zones. However, herein an illustrative example will be described where the viewing zones are used to display images of the same content at different perspectives (views). In other words, each subset of the pixel array associated with a given viewing zone displays a different view of the same content. As a viewer changes viewing zones, the appearance of the content gradually changes to simulate looking at a real-world object. Each one of the plurality of views (e.g., two-dimensional images) rendered by circuitry 102 may include a respective target brightness value for each pixel in a target two-dimensional image.

Content rendering circuitry 102 may render content for the plurality of views based on a two-dimensional image and a three-dimensional image. The two-dimensional image and three-dimensional image may be images of the same content. In other words, the two-dimensional image may provide color/brightness information for given content while the three-dimensional image provides a depth map associated with the given content. The two-dimensional image only has color/brightness information for one view of the given content. However, content rendering circuitry 102 may render two-dimensional images for additional views based on the depth map and the two-dimensional image from the original view. Content rendering circuitry 102 may render as many two-dimensional images (views) as there are viewing zones in the display (e.g., more than 1, more than 2, more than 6, more than 10, more than 12, more than 16, more than 20, more than 30, more than 40, less than 40, between 10 and 30, between 12 and 25, etc.).

Content rendering circuitry 102 may optionally include a machine learning model. The machine learning model may use additional information (e.g., additional images of the content) to render two-dimensional images (views) for each viewing zone in the display.

After content rendering circuitry 102 generates content for a plurality of different views, each view may undergo processing from per-view processing circuitry 124. Per-view processing circuitry 124 (sometimes referred to as per-2D-image compensation circuitry 124, pre-mapping processing circuitry 124, etc.) may individually process each two-dimensional image rendered by circuitry 102. The per-view processing circuitry is used to make content adjustments that are based on the perceived image that ultimately reaches the viewer (e.g., the pixels that are adjacent on the user's retina when viewing the display). As shown in FIG. 9, per-view processing circuitry 124 includes tone mapping circuitry 106, ambient light adaptation circuitry 108, white point calibration circuitry 110, and dithering circuitry 112.

Pre-processing circuitry 104 may be used to adjust each two-dimensional image to improve sharpness and mitigate aliasing. Once the two-dimensional image is ultimately displayed on pixel array 62 for viewing in a given viewing zone, the lenticular lenses in the display anisotropically magnify the image in the given viewing zone. In the example of FIG. 5, the lenticular lenses magnify light in the X-dimension while not magnifying the light in the Y-dimension. This anisotropic magnification may cause aliasing in the image perceived by the user.

To mitigate the aliasing and improve image quality, the two-dimensional image is pre-processed by circuitry 104. Pre-processing circuitry 104 may apply an anisotropic low-pass filter to the two-dimensional image. This mitigates aliasing when the pre-processed image is displayed and perceived by a viewer. As another option, the content may be resized by pre-processing circuitry 104. In other words, pre-processing circuitry 104 may change the aspect ratio of the two-dimensional image for a given view (e.g., by shrinking the image in the X-direction that is effected by the lenticular lenses). Anisotropic resizing of this type mitigates aliasing when the pre-processed image is displayed and perceived by the viewer.

The example of pre-processing circuitry processing image data from content rendering circuitry 102 is merely illustrative. In another example, the pre-processing may occur during the initial rendering (e.g., content rendering circuitry 102 performs the pre-processing).

After pre-processing circuitry 104 pre-processes each image, tone mapping circuitry 106 may be used to select a content-luminance-to-display luminance mapping to be used in displaying content on the display. A content-luminance-to-display-luminance mapping may be characterized by tone mapping parameters such as a black level, a reference white level, a specular white level, skin tone level, and the slope or the gamma of the mapping. As shown in FIG. 9, the tone mapping parameters may be selected based on factors such as ambient light level and brightness setting. These examples are merely illustrative, and other factors may be used to select the tone mapping parameters if desired (e.g., content statistics, display characteristics, point of gaze information, power source and consumption information, per-window information, etc.).

With one illustrative configuration, tone mapping circuitry 106 may select a desired tone mapping curve based on operating conditions such as display brightness settings (e.g., user defined brightness settings and brightness levels set by device 10 to accommodate a normal power operating mode and a low-power operating mode), ambient conditions (ambient light level and ambient light color), content statistics (e.g., information on average pixel luminance and burn-in risk or other information on operating conditions having a potential impact on display lifetime, quality information, dynamic range information etc.), display characteristics (e.g., display limitations such as maximum achievable pixel luminance), power constraints (e.g., due to thermal limitations and/or other considerations), whether device 10 is operating on DC power (power from a battery) or AC power, etc.

After tone mapping is performed by tone mapping circuitry 106, each view may have an associated two-dimensional array of display luminance values (that are obtained using the identified tone maps).

Next, ambient light level adaptation circuitry 108 may be used to adjust the two-dimensional images based on the ambient light level and/or ambient light color. The ambient light information used by circuitry 108 may be obtained by an ambient light sensor in device 10. Ambient light level adaptation circuitry 108 may also use information such as a brightness setting (e.g., a user defined brightness setting, a brightness setting associated with an operating mode such as a normal operating mode or low-power operating mode) to compensate each view. Ambient light level adaptation circuitry 108 may be used to adjust the brightness and color of each two-dimensional image based on the ambient light level and ambient light color. Adapting the content to the ambient viewing conditions in this way may improve the image quality for the user. White point calibration circuitry 110 may be used to adjust the white point of the display (e.g., based on the ambient light level, brightness settings, and/or other operating conditions) during white point calibration operations.

After the content from circuitry 102 is processed by pre-processing circuitry 104, tone mapping circuitry 106, ambient light adaptation circuitry 108, and white point calibration circuitry 110, dithering circuitry 112 may be used to dither the display luminance values. Dithering the luminance values may involve blending the luminance values of different pixels on the panel by randomly adding noise to the luminance values. Adding noise to the luminance values in this manner may reduce distortion when the image is ultimately displayed by the pixel array, manipulated by the lenticular lenses, and viewed by the viewer.

After each two-dimensional image is independently processed by circuitry 124, the two-dimensional images may be mapped to pixels in the pixel array using pixel mapping circuitry 114. Pixel mapping circuitry 114 may receive all of the two-dimensional images that are independently processed by per-view processing circuitry 124. Pixel mapping circuitry 114 may also receive (or include) a display calibration map that indicates how each view corresponds to the pixel array.

For example, the pixel mapping circuitry may receive a first two-dimensional image that corresponds to a first view intended for viewing zone 1 of the display. The display calibration map may identify a first subset of pixels in the pixel array that is visible at viewing zone 1. Accordingly, the first two-dimensional image is mapped to the first subset of pixels. Once displayed, the first two-dimensional image is viewable at viewing zone 1. The pixel mapping circuitry may also receive a second two-dimensional image that corresponds to a second view intended for viewing zone 2 of the display. The display calibration map may identify a second subset of pixels in the pixel array that is visible at viewing zone 2. Accordingly, the second two-dimensional image is mapped to the second subset of pixels. Once displayed, the second two-dimensional image is viewable at viewing zone 2. This type of pixel mapping is repeated for every view included in the display. Once complete, pixel mapping circuitry 114 outputs pixel data for each pixel in the pixel array. The pixel data includes a blend of all of the independent, two-dimensional images from per-view processing circuitry 124.

It should be understood that the subset of pixels used to display each view may be non-continuous. For example, the subset of pixels for each view may include a plurality of discrete vertical pixel strips. These discrete sections of pixels may be separated by pixels that are used to display other views to the viewer.

In some cases, the array of pixels may be at an angle relative to the lenticular lenses. For example, the array of pixels may extend diagonally and the lenticular lenses may extend vertically. The display calibration map may take into account the diagonal arrangement of the pixels.

After pixel mapping is complete, panel-level processing circuitry 126 (sometimes referred to as post-mapping processing circuitry 126) may be used to perform additional processing on the pixel data. Panel-level processing circuitry 126 may include color compensation circuitry 116, border masking circuitry 118, burn-in compensation circuitry 120, and panel response correction circuitry 122. In contrast to per-view processing circuitry 124, panel-level processing circuitry 126 may be used to make adjustments that are based on the pixels on the display panel (as opposed to perceived pixels at the user's eye).

Color compensation circuitry 116 may be used to compensate the pixel data using a color look up table. Color compensation circuitry 116 may adjust the color of the pixel data.

Border masking circuitry 118 may be used to impart a desired shape to the light-emitting area of the display. For example, the display may include a rectangular array of pixels. If all of the pixels in the rectangular array emitted light, the display area would appear to be rectangular. In some cases, however, it may be desirable for the light-emitting area of the display to have a different shape (e.g., rounded corners). Portions of the display may therefore be dimmed (masked) to impart a desired shape to the visible area of the display. As one example, the display may be masked such that the light-emitting area has a rectangular shape with rounded corners.

In one possible scheme, pixels outside of the target area may be turned entirely off to achieve the desired shape. However, in some cases, a binary on/off scheme results in jagged edges to the target shape. For example, the target curved corner may have a jagged appearance instead of appearing as a smooth curve. To mitigate this type of undesired jaggedness, the pixels in the area adjacent to the border between the active (light-emitting) and inactive (non-light-emitting) areas of the display may be partially dimmed. For example, each pixel in this region may have an associated dimming factor. Border masking circuitry 118 may apply the dimming factor for each pixel to that pixel to modify the pixel data. Pixels far outside the active area may be totally dimmed (e.g., turned off). Pixels closer to the active area may be partially dimmed (e.g., the pixels are dimmed but still emit light) such that a smooth curve is achieved at the border. The border masking circuitry 118 may be used to apply any desired shape to the active area of the display.

Burn-in compensation circuitry 120 may be used to compensate the pixel data to mitigate risk of burn-in and/or mitigate visible artifacts caused by burn-in. Some displays such as plasma displays and organic light-emitting diode displays may be subject to burn-in effects. Burn-in may result when a static image is displayed on a display for an extended period of time. This can cause uneven wear on the pixels of the display. If care is not taken, burn-in effects can lead to the creation of undesired ghost images on a display.

To help avoid burn-in effects, burn-in compensation circuitry 120 may impose burn-in constraints on the pixel data. The constraints that are imposed may include peak luminance constraints, dwell time constraints, color constraints, constraints on the shapes and sizes of displayed elements, and constraints on element style. These constraints may help equalize pixel wear across the display and thereby avoid situations in which static elements create burn-in. Pixel usage history may be taken into account when performing burn-in mitigation operations. For example, burn-in compensation circuitry 120 may determine how long a given pixel in the array has been static, the long-term total usage of that pixel, etc. Based on this information, burn-in compensation circuitry may adjust the pixel brightness (e.g., to mitigate additional burn-in). Burn-in compensation circuitry may also use the pixel usage history to prevent burn-in from causing visible artifacts in the display (e.g., by increasing or decreasing the brightness of the pixels based on usage history).

Panel response correction circuitry 122 (sometimes referred to as gamma correction circuitry 122) may be used to map luminance levels for each pixel to voltage levels (e.g., voltages applied to the pixels using display driver circuitry). A gamma curve (e.g., brightness vs. voltage) may be used to identify appropriate pixel voltages for each target pixel luminance level. The target pixel voltages are then provided to display driver circuitry 30. Display driver circuitry 30 provides the target pixel voltages to pixel array 62 using data lines (e.g., D in FIG. 2). The images are then displayed on display 14.

It should be noted that display pipeline circuitry 64 (content rendering circuitry 102, pre-processing circuitry 104, tone mapping circuitry 106, ambient light adaptation circuitry 108, white point calibration circuitry 110, dithering circuitry 112, pixel mapping circuitry 114, color compensation circuitry 116, border masking circuitry 118, burn-in compensation circuitry 120, and panel response correction circuitry 122) may be implemented using one or more microprocessors, microcontrollers, digital signal processors, graphics processing units, application-specific integrated circuits, and other integrated circuits. In one example, rendering circuitry 102, pre-processing circuitry 104, tone mapping circuitry 106, ambient light adaptation circuitry 108, white point calibration circuitry 110, dithering circuitry 112, and pixel mapping circuitry 114 may be formed in a graphics processing unit and color compensation circuitry 116, border masking circuitry 118, burn-in compensation circuitry 120, and panel response correction circuitry 122 may be formed in a separate application-specific integrated circuit.

The illustrative order of operations described in connection with FIG. 9 is merely illustrative. In general, the circuitry of FIG. 9 may process pixel data for the display in any desired order. However, there may be some advantageous to the order presented in FIG. 9.

For example, it should be noted that per-view processing circuitry 124 is used to process the pixel data before pixel mapping whereas panel-level processing circuitry 126 is used to process the pixel data after pixel mapping. This allows processing that relies on the final view of the image (e.g., per-view processing) to be completed before the data is split to a subset of pixels on the panel and interleaved with other views during pixel mapping. Once pixel mapping is complete, the processing that relies on the full panel luminance values (e.g., panel-level processing) may be completed.

As another example, it may be advantageous for tone mapping circuitry 106 to perform tone mapping before the white point calibration is performed by white point calibration circuitry 110. Additionally, it may be advantageous for panel response correction circuitry 122 to process the pixel data last (so that the pixel data remains in the luminance instead of voltage domain during processing).

Figure 10:
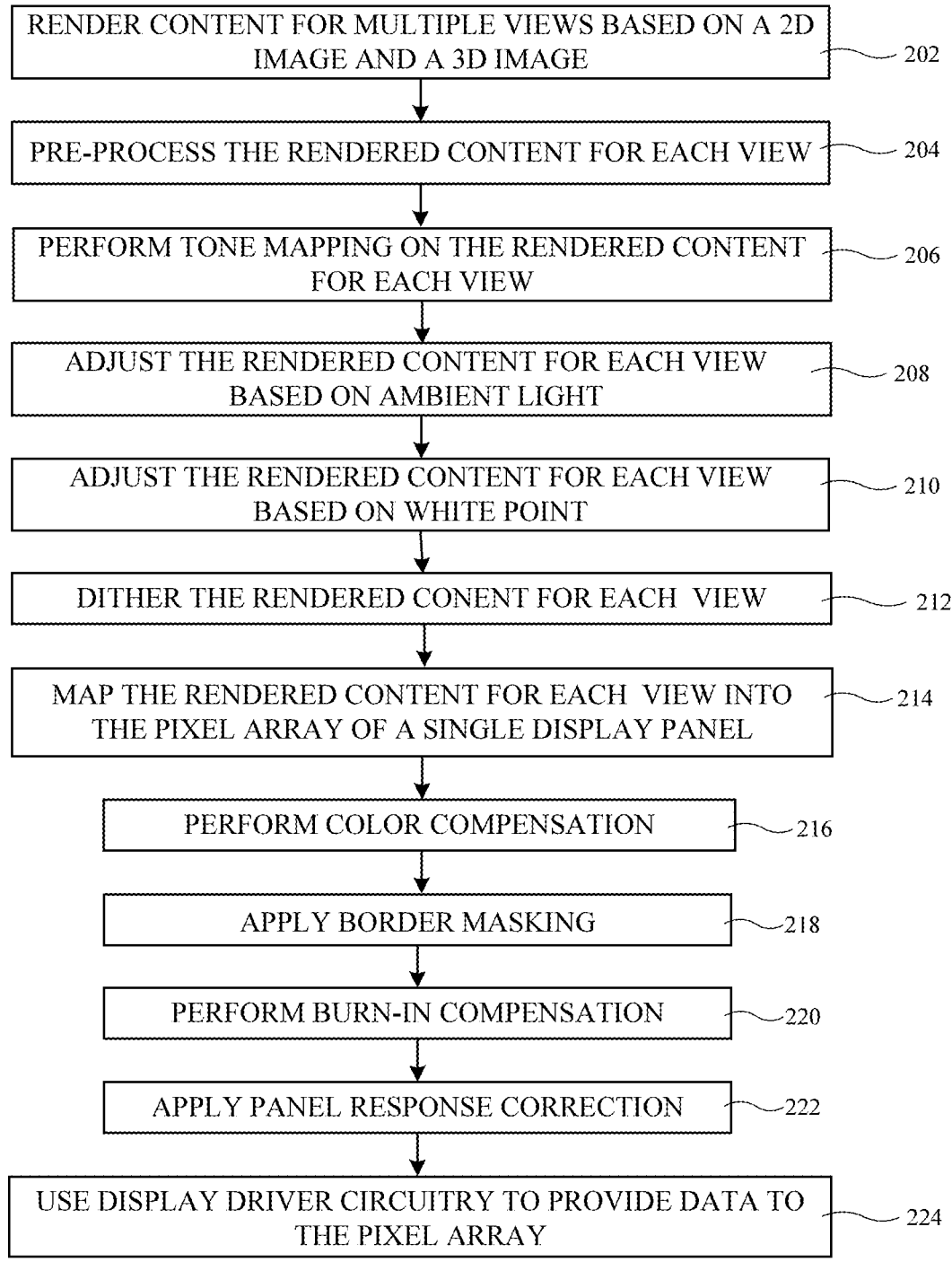
FIG. 10 is a flowchart of illustrative method steps for operating a lenticular display with display pipeline circuitry such as the display of FIG. 9 in accordance with an embodiment.

FIG. 10 is a flowchart of illustrative method steps for operating an electronic device with a pipeline of the type shown in FIG. 9. As shown in FIG. 10, control circuitry (e.g., content rendering circuitry 102) may render content for multiple views at step 202. The content rendered at step 202 may be based on a two-dimensional image and a three-dimensional image, in one example. Each one of the multiple views may be a two-dimensional image of the same content from a different perspective, in one example. The multiple views may instead include different two-dimensional images of entirely different content in another example (e.g., to display one type of content to one user and a different type of content to another user).

At step 204, the rendered content for each view is pre-processed by the control circuitry (e.g., pre-processing circuitry 104). The pre-processing may include filtering and/or reshaping the content to mitigate aliasing when the images are later displayed.

At step 206, control circuitry (e.g., tone mapping circuitry 106) is used to perform tone mapping on the rendered content for each view. The tone mapping may involve converting content luminance values to display luminance values based on tone maps. The tone maps may be adjusted based on various factors such as the brightness setting (e.g., a brightness setting provided by the user using an input component) and/or the ambient light level (e.g., obtained by an ambient light sensor in the device).

At step 208, control circuitry (e.g., ambient light adaptation circuitry 108) may adjust the rendered content for each view based on ambient light (and/or the brightness setting). The display luminance values for each pixel in the rendered content may optionally be adjusted. The ambient light levels used at step 208 may be obtained by an ambient light sensor in the device.

At step 210, control circuitry (e.g., white point calibration circuitry 110) may adjust the rendered content for each view based on white point. The white point calibration circuitry may adjust the white point for the display based on the brightness setting (e.g., a brightness setting provided by the user using an input component) and/or the ambient light level (e.g., obtained by an ambient light sensor in the device).

At step 212, control circuitry (e.g., dithering circuitry 112) may be used to dither the rendered content for each view. Dithering the content may include adding white noise to the display luminance values to blend the display luminance values. In general, any desired type of dithering may be performed. The dithering may improve image quality in the displayed images.

At step 214, control circuitry (e.g., pixel mapping circuitry 114) may be used to map the rendered content (e.g., the processed content) for each view into the pixel array of a single display panel (e.g., display panel 20 with pixel array 62). The pixel mapping circuitry 114 may use a display calibration map to assign the display luminance values of each view to a respective subset of pixels on the display panel.

At step 216, control circuitry (e.g., color compensation circuitry 116) may perform color compensation (e.g., using a color look up table).

At step 218, control circuitry (e.g., border masking circuitry 118) may apply border masking such that the active area (light-emitting area) of the display has a desired shape. Pre-determined dimming factors may be applied to the display luminance values by border masking circuitry 118 (e.g., such that the active area has a smooth border).

At step 220, control circuitry (e.g., burn-in compensation circuitry 120) may perform burn-in compensation. The burn-in compensation may be used to mitigate burn-in and/or mitigate visible artifacts on the display as a result of burn-in.

At step 222, control circuitry (e.g., panel response correction circuitry 122) may apply a panel response correction. The panel response correction may be used to map the target display luminance values for the pixels to corresponding voltages. Gamma curves may be used to convert the display luminance values to voltages.

At step 224, display driver circuitry may provide data to the pixel array (e.g. using data lines). The data may include the voltages output from panel response correction circuitry 122. The pixel array emits light for each of the views based on the received data (voltages) from the display driver circuitry.

Steps 204 through 212 may be referred to as per-view processing steps and may be performed before pixel mapping. Steps 216 through 222 may be referred to as panel-level processing steps and may be performed after pixel mapping.

FIGS. 9 and 10 show an arrangement where multiple two-dimensional images are rendered for respective viewing zones in the display. Subsequently, a display calibration map is used to determine which pixels in the pixel array correspond to each view (e.g., each of the plurality of two-dimensional images). In this example, the display calibration map may identify a first subset of pixels in the pixel array that is visible at a first viewing zone, a second subset of pixels in the pixel array that is visible at a second viewing zone, etc. This example is merely illustrative.

Figure 11:
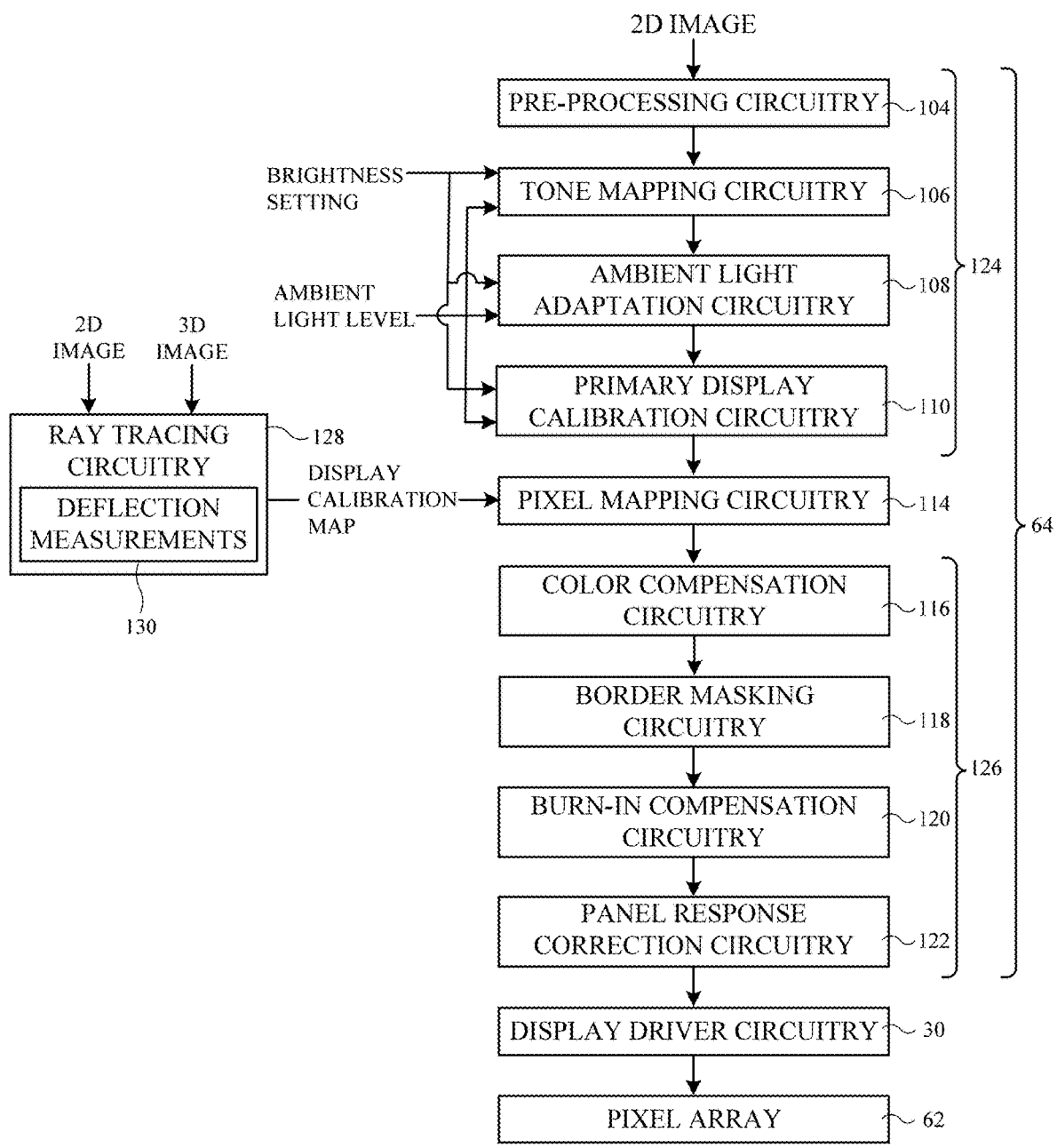
FIG. 11 is a schematic diagram of an illustrative lenticular display with ray tracing circuitry in accordance with an embodiment.

In an alternate arrangement, shown in FIG. 11, ray tracing circuitry 128 may be included in display pipeline circuitry 64. In FIG. 11, a two-dimensional image of given content (e.g., content intended for display on display 14) may be provided to pre-processing circuitry 104. The two-dimensional image of the given content may undergo the subsequent processing by circuitry 104, 106, 108, and 110. Calibration circuitry 110 in FIG. 11 is primary display calibration circuitry (e.g., that calibrates the display using brightness setting and/or ambient light level).

Ray tracing circuitry 128 may use the two-dimensional image of the given content, a three-dimensional image of the given content, and stored deflection measurements 130 to determine a display calibration map that is used by pixel mapping circuitry 114. The two-dimensional image and the three-dimensional image may be images captured by one or more sensors in input-output devices 12 of electronic device 10. Alternatively, the two-dimensional image and/or the three-dimensional image may be computer-generated images or images captured by one or more sensors in another electronic device. In the event that the two-dimensional image and/or the three-dimensional image are computer-generated images, the computer-generated images may optionally be based on images captured by one or more sensors in input-output devices 12 of electronic device 10 or may optionally be based on images captured by one or more sensors in another electronic device.

The stored deflection measurements 130 may be stored in any desired type of memory. The stored deflection measurements may include, for each sub-pixel in display 14, a horizontal deflection angle of light emitted by that sub-pixel.

Figure 12:
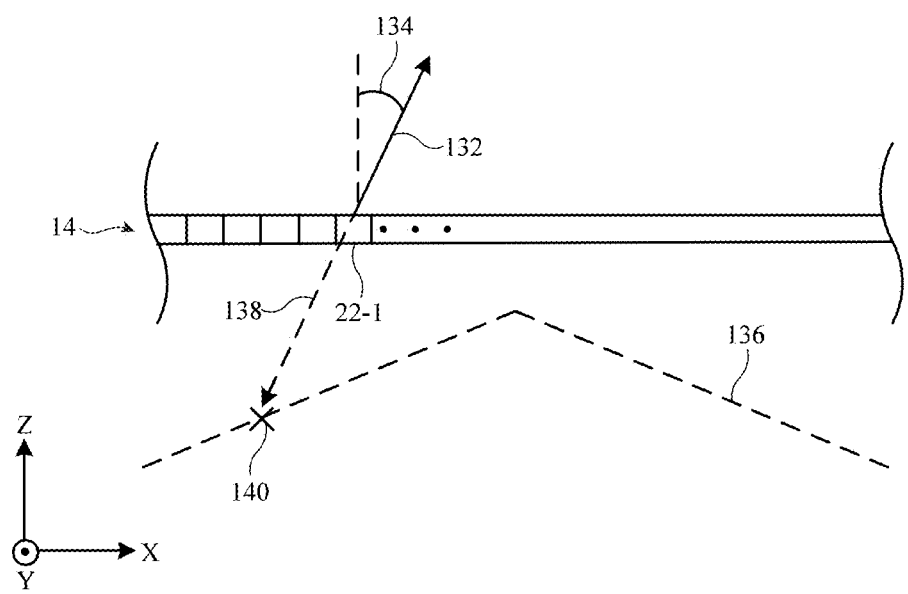
FIG. 12 is a side view of an illustrative display showing how a deflection angle for a given pixel and ray tracing may be used to determine an intersection point on a three-dimensional surface in accordance with an embodiment.

FIG. 12 is a side view of display 14 showing how the ray tracing process may be performed by ray tracing circuitry 128. As shown, a given sub-pixel 22-1 within display 14 may emit light in direction 132 (e.g., after the light is deflected by the lenticular lenses 42 as previously shown). Direction 132 may be at an angle 134 relative to a reference direction (e.g., the surface normal of the lenticular display or another desired reference direction). Each sub-pixel may have an associated direction 132 and angle 134. The angle 134 (sometimes referred to as deflection angle 134, horizontal deflection angle 134, etc.) for each sub-pixel is stored in deflection measurements 130 in FIG. 11. The deflection measurements may be obtained during calibration operations during manufacturing electronic device 10, as one example. The deflection measurements may be obtained using display calibration parameters such as lens pitch, pixel size, lens alignment, etc.

FIG. 12 shows how display 14 may intend to display a three-dimensional surface 136. The target three-dimensional surface may be obtained, for example, from the three-dimensional image received at ray tracing circuitry 128. Ray tracing circuitry 128 may, for each sub-pixel in display 14, trace a ray 138 in the opposite direction of the outgoing direction 132 for that sub-pixel. In this way, ray tracing circuitry 128 simulates how a viewer perceives the light from that sub-pixel. Ray tracing circuitry 128 may, for each sub-pixel in display 14, determine the point 140 on three-dimensional surface 136 that is intersected by ray 138. Ray tracing circuitry 128 may also know the correlation between a location on the three-dimensional surface (of the given content) 136 and a corresponding location on the corresponding two-dimensional image (of the given content).

Ray tracing circuitry 128 outputs a display calibration map that includes, for each sub-pixel in display 14, the location of a corresponding point on the two-dimensional image of the given content (e.g., the 2D image received by ray tracing circuitry 128 and pre-processing circuitry 104). Pixel mapping circuitry 114 subsequently uses the display calibration map to map the two-dimensional image that is intended to be displayed on display 14 to the pixel array of display 14. For every sub-pixel of the display, pixel mapping circuitry 114 obtains a corresponding color value from the two-dimensional image that is intended to be displayed on display 14 (using the display calibration map with coordinates that identify, for each sub-pixel in display 14, the location of a corresponding point on the two-dimensional image of the given content). Pixel mapping circuitry may perform the pixel mapping operations for each display frame (e.g., at a frequency that is equal to the display frame rate).

The display pipeline circuitry in FIG. 11 includes pre-mapping processing circuitry 124 that processes the 2D image before pixel mapping and post-mapping processing circuitry 126 that processes the panel image after pixel mapping (similar to as in FIG. 9). However, only one 2D image is processed by circuitry 104, 106, 108, and 110 in FIG. 11.

Instead of binning pixels into a discrete number of viewing zones (e.g., 14 viewing zones) as in FIG. 9, the ray tracing in FIG. 11 allows each sub-pixel to essentially be assigned a respective viewing zone. This allows the displayed images to be better optimized and mitigates crosstalk in the three-dimensional images displayed by lenticular display 14.

A 2D image may be processed by pipeline circuitry 64 (e.g., pre-processing circuitry 104 receives a 2D image that is processed) at a rate that is equal to the display frame rate of display 14. In contrast, the ray tracing operation performed by ray tracing circuitry 128 may be performed non-periodically or periodically at a second frequency that is lower than the display frame rate. In other words, ray tracing circuitry 128 outputs a new display calibration map based on an updated 3D image at the second frequency. The display frame rate may be at least 5× greater than the second frequency, at least 10× greater than the second frequency, at least 30× greater than the second frequency, at least 50× greater than the second frequency, at least 100× greater than the second frequency, etc. In other words, the ray tracing operation performed by ray tracing circuitry 128 (that generates a display calibration map) is asynchronous with the display frame rate. External stimuli (e.g., detected by one or more sensors in device 10) may trigger ray tracing circuitry 128 to generate a new display calibration map.

An example is described herein where display 14 includes a lenticular lens film 42 that spreads light across one dimension (e.g., across the horizontal dimension or the X-axis in FIG. 5). This example is merely illustrative. In another possible arrangement, the display 14 may include a lens array that enables full parallax (e.g., both horizontal and vertical) in the display. The lens film over the display panel may include an array of lenses that each spread light both along the horizontal direction (e.g., the X-axis in FIG. 5) and along the vertical direction (e.g., the Y-axis in FIG. 5). One benefit of the ray tracing scheme described in connection with FIGS. 11 and 12 is that computation demand is low for both a lens film that spreads light across one dimension and a lens film that spreads light across two dimensions. The computation demand for the ray tracing operation is determined by the number of sub-pixels and the number of ray tracing calculations that are needed. In other words, the computation demand for the ray tracing operation is not increased when display 14 has a lens film that spreads light across two dimensions.

In FIGS. 9 and 11, display pipeline circuitry 64 (content rendering circuitry 102, pre-processing circuitry 104, tone mapping circuitry 106, ambient light adaptation circuitry 108, calibration circuitry 110 (white point calibration circuitry in FIG. 9 and primary display calibration circuitry in FIG. 11), dithering circuitry 112, pixel mapping circuitry 114, color compensation circuitry 116, border masking circuitry 118, burn-in compensation circuitry 120, panel response correction circuitry 122 and/or ray tracing circuitry 128) may sometimes be referred to as part of display 14 and/or may sometimes be referred to as control circuitry (e.g., part of control circuitry 16 in FIG. 1). Each component in display pipeline circuitry 64 (e.g., content rendering circuitry 102, pre-processing circuitry 104, tone mapping circuitry 106, ambient light adaptation circuitry 108, calibration circuitry 110 (white point calibration circuitry in FIG. 9 and primary display calibration circuitry in FIG. 11), dithering circuitry 112, pixel mapping circuitry 114, color compensation circuitry 116, border masking circuitry 118, burn-in compensation circuitry 120, panel response correction circuitry 122 and/or ray tracing circuitry 128) may be formed using one or more microprocessors, microcontrollers, digital signal processors, application specific integrated circuits, etc.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device comprising:
    a display that includes an array of pixels and a lenticular lens film formed over the array of pixels;
    ray tracing circuitry configured to, using ray tracing, a three-dimensional image, and deflection measurements for the array of pixels, output a display calibration map that includes, for each pixel in the array of pixels, a corresponding location on a two-dimensional image; and
    pixel mapping circuitry configured to, using the display calibration map from the ray tracing circuitry, map the two-dimensional image to respective pixels on the array of pixels to obtain pixel data for the array of pixels.

2. The electronic device defined in claim 1, wherein the lenticular lens film spreads light from the array of pixels in a horizontal direction.

3. The electronic device defined in claim 2, wherein each pixel in the array of pixels has a corresponding deflection measurement of the deflection measurements and wherein the deflection measurement for each pixel represents a horizontal deflection of light emitted by that pixel.

4. The electronic device defined in claim 3, wherein the ray tracing circuitry is configured to use the deflection measurement for a pixel to trace a ray in an opposite direction of the light emitted by that pixel.

5. The electronic device defined in claim 4, wherein the ray tracing circuitry is configured to determine where the ray in the opposite direction intersects a three-dimensional surface from the three-dimensional image.

6. The electronic device defined in claim 1, wherein the display operates at a frame rate and wherein the ray tracing circuitry is configured to output the display calibration map at a second frequency that is lower than the frame rate.

7. The electronic device defined in claim 6, wherein the frame rate is at least 50 times greater than the second frequency.

8. The electronic device defined in claim 1, further comprising:
pre-mapping processing circuitry configured to process the two-dimensional image before the two-dimensional image is provided to the pixel mapping circuitry.

9. The electronic device defined in claim 8, wherein the pre-mapping processing circuitry is configured to dither the two-dimensional image.

10. The electronic device defined in claim 9, wherein the pre-mapping processing circuitry is configured to tone map the two-dimensional image.

11. The electronic device defined in claim 10, wherein the pre-mapping processing circuitry is configured to, after tone mapping, adjust the two-dimensional image based on an ambient light level.

12. The electronic device defined in claim 11, wherein the pre-mapping processing circuitry is configured to, after tone mapping, perform a white point calibration for the two-dimensional image.

13. The electronic device defined in claim 12, wherein the pre-mapping processing circuitry is configured to, before tone mapping, pre-process the two-dimensional image.

14. The electronic device defined in claim 13, wherein pre-processing the two-dimensional image comprises applying an anisotropic low-pass filter to the two-dimensional image.

15. The electronic device defined in claim 1, further comprising:
post-mapping processing circuitry configured to process the pixel data for the array of pixels after the two-dimensional image is provided to the pixel mapping circuitry.

16. The electronic device defined in claim 15, wherein the post-mapping processing circuitry is configured to perform burn-in compensation on the pixel data.

17. The electronic device defined in claim 16, wherein the post-mapping processing circuitry is configured to selectively apply dimming factors to the pixel data.

18. The electronic device defined in claim 17, wherein the post-mapping processing circuitry is configured to convert the pixel data to voltage levels.

19. An electronic device comprising:
one or more sensors that are configured to capture a two-dimensional image and a three-dimensional image; and
a display with an array of pixels overlapped by lenticular lenses, wherein the display is configured to:
receive the three-dimensional image from the one or more sensors;
based on the three-dimensional image and deflection measurements for the array of pixels, use ray tracing to obtain a display calibration map that includes, for each pixel in the array of pixels, a corresponding location on the two-dimensional image;
using the display calibration map, map the two-dimensional image to respective pixels on the array of pixels to obtain pixel data for the array of pixels; and
display the pixel data for the array of pixels.

20. A method of operating an electronic device with at least one sensor and a display having an array of pixels overlapped by lenticular lenses, the method comprising:
based on a three-dimensional image from the at least one sensor and deflection measurements for the array of pixels, using ray tracing to obtain a display calibration map that includes, for each pixel in the array of pixels, a corresponding location on a two-dimensional image;
using the display calibration map, mapping the two-dimensional image to respective pixels on the array of pixels to obtain pixel data for the array of pixels; and
displaying the pixel data for the array of pixels.

* * * * *